US011017033B2

(12) United States Patent
Oliveira et al.

(10) Patent No.: US 11,017,033 B2
(45) Date of Patent: May 25, 2021

(54) SYSTEMS AND METHODS FOR MODELING FREE-TEXT CLINICAL DOCUMENTS INTO A HIERARCHICAL GRAPH-LIKE DATA STRUCTURE BASED ON SEMANTIC RELATIONSHIPS AMONG CLINICAL CONCEPTS PRESENT IN THE DOCUMENTS

(71) Applicant: KONINKLIJKE PHILIPS N.V., Eindhoven (NL)

(72) Inventors: Lucas de Melo Oliveira, Wilmington, MA (US); Douglas Henrique Teodoro, São Paulo (BR)

(73) Assignee: Koninklijke Philips N.V., Eindhoven (NL)

(*) Notice: Subject to any disclaimer, the term of this patent is extended or adjusted under 35 U.S.C. 154(b) by 252 days.

(21) Appl. No.: 16/099,548

(22) PCT Filed: May 15, 2017

(86) PCT No.: PCT/EP2017/061549
§ 371 (c)(1),
(2) Date: Nov. 7, 2018

(87) PCT Pub. No.: WO2017/202631
PCT Pub. Date: Nov. 30, 2017

(65) Prior Publication Data
US 2019/0114304 A1    Apr. 18, 2019

Related U.S. Application Data

(60) Provisional application No. 62/342,231, filed on May 27, 2016.

(51) Int. Cl.
*G06F 17/00* (2019.01)
*G06F 16/93* (2019.01)
(Continued)

(52) U.S. Cl.
CPC ............ *G06F 16/93* (2019.01); *G06F 16/285* (2019.01); *G06F 16/30* (2019.01); *G06F 16/9024* (2019.01); *G06F 16/958* (2019.01)

(58) Field of Classification Search
CPC ........ G06F 16/93; G06F 16/30; G06F 16/285; G06F 16/958; G06F 16/9024
See application file for complete search history.

(56) References Cited

U.S. PATENT DOCUMENTS

| 2005/0192792 A1* | 9/2005 | Carus | G06F 40/30 |
| | | | 704/2 |
| 2008/0059391 A1* | 3/2008 | Rosales | G16H 50/20 |
| | | | 706/12 |

(Continued)

OTHER PUBLICATIONS

Plaza, L. et al., "Retrieval of Similar Electronic Health Records Using UMLS Concept Graphs", Jun. 23, 2010, Natural Language Processing and Information Systems, Heidelberg, pp. 296-303.

(Continued)

*Primary Examiner* — Syed H Hasan (57) ABSTRACT

The present disclosure pertains to modeling free-text clinical documents into a hierarchical graph-like data structure based on semantic relationships among clinical concepts present in the documents. A method comprises parsing, identifying, and annotating clinical terms within free-text clinical documents. This is accomplished by storing identified clinical terms in a concept node. The concept node is a data structure that has a set of properties to categorize stored concepts. Clinical concepts of free-text clinical documents are classified into clinical event classes. The free-text clinical documents include clinical terms that were associated with clinical concept categories. Classifying clinical concepts includes organizing clinical text-free documents into sections that describe a specific aspect of the clinical text-free documents that include one or more of clinical, technical, or (Continued)

administrative aspects of the documents. Links are provided between clinical concepts such that individual clinical concepts correspond to individual concept nodes.

15 Claims, 9 Drawing Sheets

(51) Int. Cl.
    *G06F 16/30*     (2019.01)
    *G06F 16/28*     (2019.01)
    *G06F 16/958*     (2019.01)
    *G06F 16/901*     (2019.01)

(56) References Cited

U.S. PATENT DOCUMENTS

| | | | | |
|---|---|---|---|---|
| 2008/0133213 | A1* | 6/2008 | Pollara | G06F 16/36 703/22 |
| 2008/0263038 | A1* | 10/2008 | Judge | G06F 40/289 |
| 2008/0270120 | A1* | 10/2008 | Pestian | G06F 40/20 704/9 |
| 2011/0047169 | A1* | 2/2011 | Leighton | G06F 19/00 707/756 |
| 2012/0290328 | A1 | 11/2012 | McCallie et al. | |
| 2013/0030827 | A1* | 1/2013 | Snyder | G16H 70/00 705/2 |
| 2014/0129246 | A1* | 5/2014 | Vdovjak | G06F 19/325 705/2 |
| 2014/0279729 | A1* | 9/2014 | Delaney | G06N 20/00 706/12 |
| 2014/0343925 | A1* | 11/2014 | Mankovich | G06F 40/30 704/9 |

OTHER PUBLICATIONS

Aronson, A.R., "Effective mapping of biomedical text to the UMLS Metathesaurus: the MetaMap program", Proceedings/AMIA . . . Annual Symposium, Jan. 1, 2001, pp. 17-21.

* cited by examiner

Exam Header: CT INFUSED CHEST, CT INFUSED UPPER ABDOMEN, 09-May-2007 10:42 AM

Clinical Data: CLINICAL DATA: 62-year-old male with abdominal pain. Status post chemotherapy.

Technique: TECHNIQUE: Contrast enhanced scans of the thorax and upper abdomen were ...

Findings:

CT CHEST FINDINGS:
LUNGS AND PLEURA: Bilateral small to moderate pleural effusions with adjacent atelectasis.
A 5mm left upper lobe nodule (series 9, image 91), is non-specific.
Faint groundglass opacity raises the question of mild edema.

ABDOMEN:
LIVER, BILIARY TRACT: No significant abnormality noted

KIDNEYS, URETERS: A punctate calcification in the left renal parenchyma (image 52/148, series 3).
No evidence of hydronephrosis or hydroureter.
Simple renal cysts noted bilaterally

Impression:

IMPRESSION:
1. Dilated redundant sigmoid colon with partial twist and normal wall thickness. There is no current volvulus, however, patient is predisposed to volvulus.
2. Follow-up with CT in 6 months.

Report electronically signed: John Doe, M.D..

SYSTEMS AND METHODS FOR MODELING FREE-TEXT CLINICAL DOCUMENTS INTO A HIERARCHICAL GRAPH-LIKE DATA STRUCTURE BASED ON SEMANTIC RELATIONSHIPS AMONG CLINICAL CONCEPTS PRESENT IN THE DOCUMENTS

CROSS-REFERENCE TO PRIOR APPLICATIONS

This application is the U.S. National Phase application under 35 U.S.C. § 371 of International Application No. PCT/EP2017/061549, filed on May 15, 2017, which claims the benefit of U.S. Patent Application No. 62/342,231, filed on May 27, 2016. These applications are hereby incorporated by reference herein.

BACKGROUND

1. Field

The present disclosure relates to systems and methods for modeling free-text clinical documents into a hierarchical graph-like data structure based on semantic relationships among clinical concepts present in the documents.

2. Description of the Related Art

It is well known that the increased adoption of electronic health records (EHRs) has led to an unprecedented amount of subject health information stored in electronic format. However, the availability of overwhelmingly large records has also raised concerns of information overload, with potential negative consequences on clinical work, such as errors of omission, delays, and overall subject safety.

Free-text clinical notes (or documents) are notes that are part of a subject's medical record. They are used to document a subject's clinical status, and changes therein, during the course of outpatient care or hospitalization. Free-text clinical notes can show progress of a subject, improvements, or lack thereof. They are useful for healthcare providers to refer to and edit on an ongoing basis. Free-text is unstructured data. Free-text may be found in word processing files, email, and the like.

EHRs are not only referred to as electronic health records, and are sometimes referred to as electronic medical records (EMRs). EHR systems are computer systems that assist in the collection and manipulation of subject health (or medical) data and/or records. These records often include data comprising one or more of medical history, test results, allergies, immunization status, radiology and/or other images, vital signs, demographics, subject statistics, billing information, and/or other data. Current EHR systems lack an ability to capture and semantically measure clinical concepts in free-text clinical notes enabling search, comparison, and clustering through this large amount of subject data in a way that supports clinical workflow and cognitive clinical reasoning, as well as enabling this information be used for research and educational purposes.

SUMMARY

Accordingly, one aspect of the disclosure relates to a system configured for modeling free-text clinical documents into a hierarchical graph-like data structure based on semantic relationships among clinical concepts present in the documents. The system comprises one or more hardware processors configured by machine-readable instructions to use natural language processing for parsing, identifying, and annotating clinical terms within free-text clinical documents. This is accomplished by storing identified clinical terms in a concept node. The concept node is a data structure that has a set of properties to categorize stored concepts. Clinical concepts of free-text clinical documents are classified into clinical event classes. The free-text clinical documents include clinical terms that were associated with clinical concept categories. Classifying clinical concepts includes organizing free-text clinical documents into sections that describe a specific aspect of the free-text clinical documents that include one or more of clinical, technical, or administrative aspects of the documents. Links are provided between clinical concepts such that individual clinical concepts correspond to individual concept nodes. The links are concept edges. The concept edges have properties that further characterize relationships between corresponding pairs of clinical nodes. Characterizing the relationships includes (1) computing the concept edges using a semantic relationship between clinical concepts and (2) providing an edge score to indicate a similarity between two clinical concepts.

Another aspect of the disclosure relates to a method for a system configured for modeling free-text clinical documents into a hierarchical graph-like data structure based on semantic relationships among clinical concepts present in the documents. The method comprises parsing, identifying, and annotating clinical terms within free-text clinical documents. This is accomplished by storing identified clinical terms in a concept node. The concept node is a data structure that has a set of properties to categorize stored concepts. Clinical concepts of free-text clinical documents are classified into clinical event classes. The free-text clinical documents include clinical terms that were associated with clinical concept categories. Classifying clinical concepts includes organizing free-text clinical documents into sections that describe a specific aspect of the free-text clinical documents that include one or more of clinical, technical, or administrative aspects of the documents. Links are provided between clinical concepts such that individual clinical concepts correspond to individual concept nodes. The links are concept edges. The concept edges have properties that further characterize relationships between corresponding pairs of clinical nodes. Characterizing the relationships includes (1) computing the concept edges using a semantic relationship between clinical concepts and (2) providing an edge score to indicate a similarity between two clinical concepts.

Yet another aspect of the disclosure relates to a system configured for a system configured for modeling free-text clinical documents into a hierarchical graph-like data structure based on semantic relationships among clinical concepts present in the documents. The system comprises means for parsing, identifying, and annotating clinical terms within free-text clinical documents. This is accomplished by storing identified clinical terms in a concept node. The concept node is a data structure that has a set of properties to categorize stored concepts. Clinical concepts of free-text clinical documents are classified into clinical event classes. The free-text clinical documents include clinical terms that were associated with clinical concept categories. Classifying clinical concepts includes organizing free-text clinical documents into sections that describe a specific aspect of the free-text clinical documents that include one or more of clinical, technical, or administrative aspects of the documents. Links are provided between clinical concepts such that individual clinical concepts correspond to individual concept nodes. The links are concept edges. The concept edges have properties that further characterize relationships between corresponding pairs of clinical nodes. Characterizing the relationships includes (1) computing the concept edges using a semantic relationship between clinical concepts and (2) providing an edge score to indicate a similarity between two clinical concepts.

These and other features and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Determining similarity between two individual concepts or two sets of concepts extracted from a free-text document is important for various aspects of biomedicine, for instance, to find prior clinical reports for a subject that are relevant to the current clinical context. In addition to finding similar clinical sets, clinical researchers may be interested in identifying sets of similar subjects, such as subjects who might qualify for an experimental oncology chemotherapy protocol.

The proposed technology uses the openEHR model to illustrate the potential of the present methodology, but other clinical models such as SOAP (an acronym for subjective, objective, assessment, and plan) may be used as well.

The openEHR standard is an open specification in health informatics that describes the management and storage, retrieval and exchange of health data in EHRs. The openEHR specifications include information and service models for the EHR, demographics, clinical workflow and archetypes. One innovation in the openEHR framework is to leave all specification of clinical information out of the information model, but also, to provide powerful means of expressing what clinicians and subjects need to record so that the information can be understood and processed wherever there is a need.

The openEHR model represents the health care delivery process as a series of observation, evaluation, instruction, and action events. In this model, for example, health care is delivered by making observations, forming opinions (hypotheses), and prescribing actions (instructions) for next steps, which may be further investigation, or may be interventions designed to resolve the problem, and finally, executing the instructions (actions).

Figure 1:
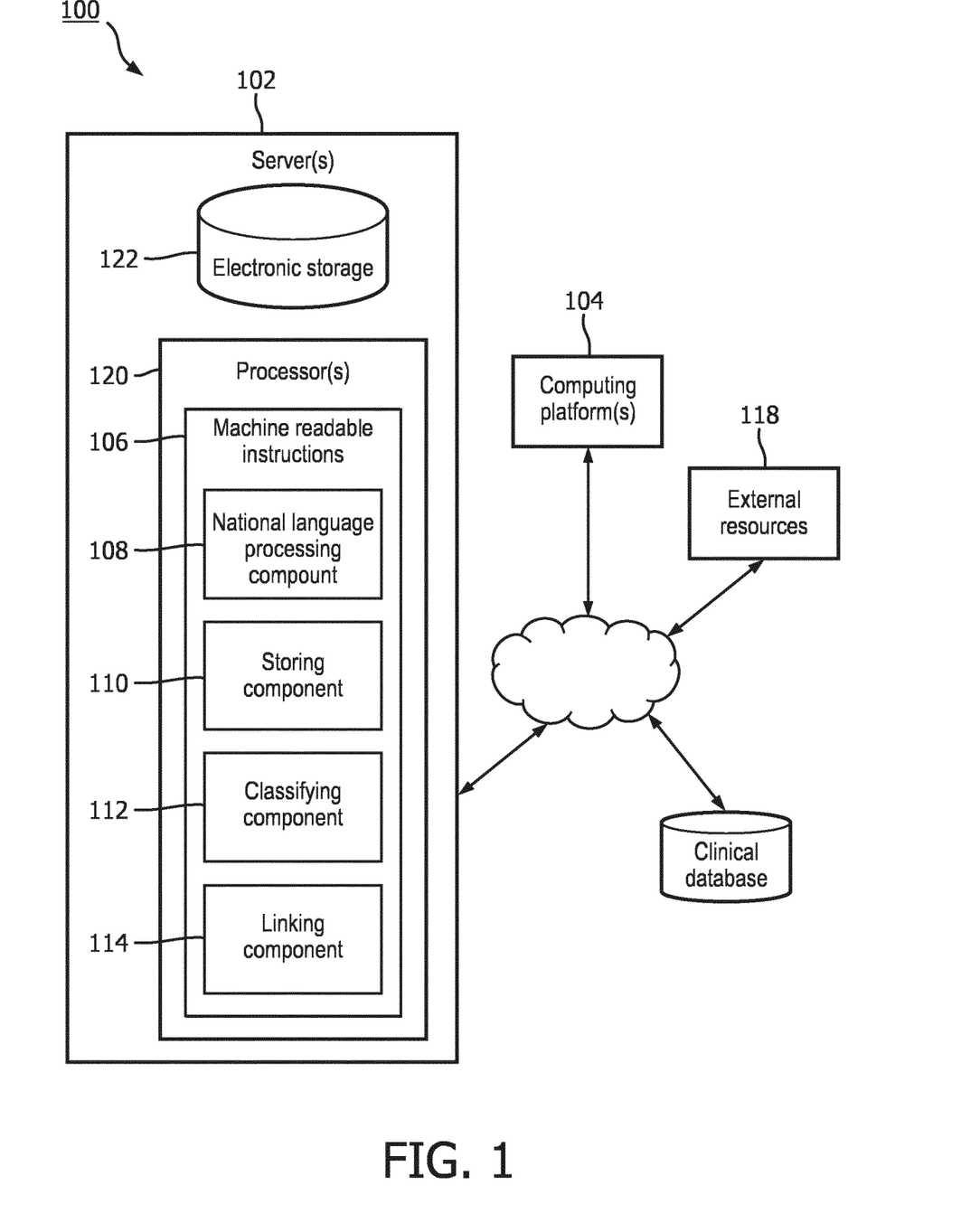
FIG. 1 illustrates a system configured for modeling free-text clinical documents into a hierarchical graph-like data structure based on semantic relationships among clinical concepts present in the documents, in accordance with one or more embodiments.

FIG. 1 illustrates a system 100 configured for modeling free-text clinical documents (and/or notes) into a hierarchical graph-like data structure based on semantic relationships among clinical concepts present in the documents, in accordance with one or more embodiments. System 100 includes a networked computer system in some embodiments. Clinical concepts include, for example, one or more of medication orders, laboratory exam results, blood pressure readings, diagnosis and procedures, and/or other data or information in various exemplary embodiments.

In some embodiments, system 100 may include one or more servers 102. The server(s) 102 may be configured to communicate with one or more computing platforms 104 according to a client/server architecture, a peer-to-peer architecture, and/or other architectures. The users may access system 100 via computing platform(s) 104.

The server(s) 102 may be configured to execute machine-readable instructions 106. The machine-readable instructions 106 may include one or more of a natural language processing component 108, a storing component 110, a classifying component 112, a linking component 114 (or linking engine), and/or other machine-readable instruction components.

Natural language processing component 108 may be configured for parsing, identifying, and annotating clinical terms within free-text clinical documents. Parsing, identifying, and annotating clinical terms may include searching for symbols or words in a natural language document, and flagging key symbols or words, in accordance with one or more embodiments. For example, this process may involve searching a word processing document for a specific allergy or health problem of a subject, identifying the allergy or health problem, and underlining or otherwise flagging it. Storing component 110 may be communicatively coupled with natural language processing component 108. Storing component 110 may be configured to store identified clinical terms in a concept node, the concept node being a data structure similar to that of a graph node that has properties to categorize stored concepts. As used herein, "communicatively coupled" may refer, but is not limited to, the use of one or more of computer networks, wireless communications, wired, communications, and or other methods of communicating. Using the openEHR framework, the concepts may be categorized into one or more of observation, evaluation, instruction, action, and/or other items. For example, in some embodiments, a concept node with action properties may store concepts related to surgery and drug administration, while a node with evaluation properties may store concepts related to diagnosis and triage evaluation.

Classifying component 112 may be communicatively coupled with storing component 110. Classifying component 112 may be configured to classify clinical concepts of free-text clinical documents into clinical event classes. The free-text clinical documents may include clinical terms that were associated with clinical concept categories. Classifying clinical concepts may include organizing free-text clinical documents into sections that describe a specific aspect of the free-text clinical documents that include one or more of clinical, technical, or administrative aspects of the documents.

Linking component 114 may be communicatively coupled with classifying component 112. Linking component 114 may be configured to provide links between clinical concepts such that individual clinical concepts correspond to individual concept nodes. The links may be concept edges. The concept edges may have properties that further characterize relationships between corresponding pairs of clinical nodes. Characterizing the relationships may include one or more of (1) computing the concept edges using a semantic relationship between clinical concepts, (2) providing an edge score to indicate a similarity between two clinical concepts, and/or other operations.

Figure 2:
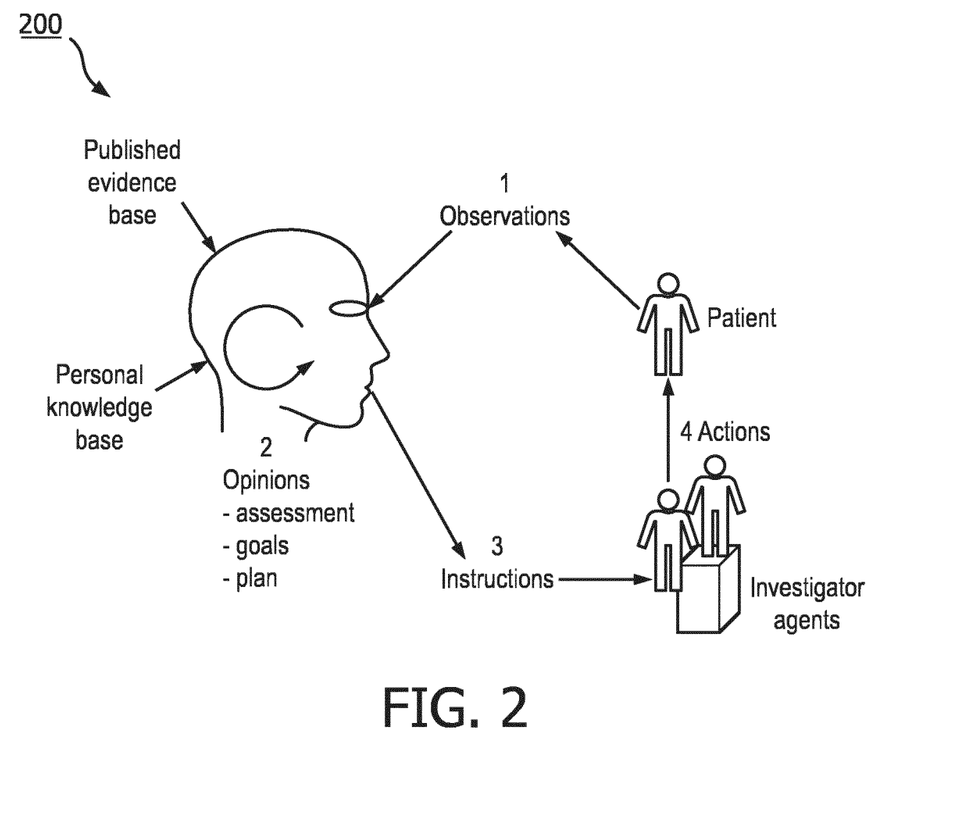
FIG. 2 is a schematic diagram of the openEHR subject care process representation, in accordance with one or more embodiments.

FIG. 2 shows a schematic diagram 200 of the openEHR subject care process representation. A subject 202 is observed. An investigator 204 makes opinions, assessments, goals, and plans. Investigator 204 may utilize a published evidence base as well as a personal knowledge base. Investigator agents 206 receive instructions from investigator 204, which they communicate to subject 202 in the form of actions to be taken.

Some embodiments according to the present technology present a system and methodology to model a free-text clinical document into a graph-like data structure that can capture the semantic relationship among clinical concepts present in the document. A semantic relationship is a relation between meanings, according to some embodiments. Examples of semantic relationships include one or more of hyponymy, hypernymy, synonymy, and/or other concepts. Hyponymy refers to when a concept belongs to a lower (concept) class in a hierarchy. Hypernymy refers to when a concept belongs to a higher (concept) class in a hierarchy. Synonymy refers to concepts that have the same meaning or are synonymous. Using simple word matching techniques, such as lexicon-based comparisons, is typically not sufficient to determine an accurate measure of similarity. Advantageously, graph-like structures utilize a hierarchical classification of clinical concepts based in clinical models paradigm to add a new dimensionality in the document analysis. This may enable the implementation of several inter-subject and inter-document measure of similarity as well graph simplification methodology to reduce the complexity and/or capture the core information stored in this structure.

This approach may be based on well-established clinical models such as openEHR and SOAP. The large amount of free-text clinical documents stored in electronic format has limited the full utilization of this data. This graph-like data structure utilizes a hierarchical classification of clinical concepts based in clinical models paradigm to add a new dimensionality to understand the semantic relationship between clinical concepts stored in free-text documents. This approach allows clinical concepts to be independently analyzed depending of their context in a clinical document. The present technology may be used to measure document similarity, inter-subject similarity, timeline dashboard, semantic search, and in research applications such as clinical trials (inclusion/exclusion criteria).

Figure 3:
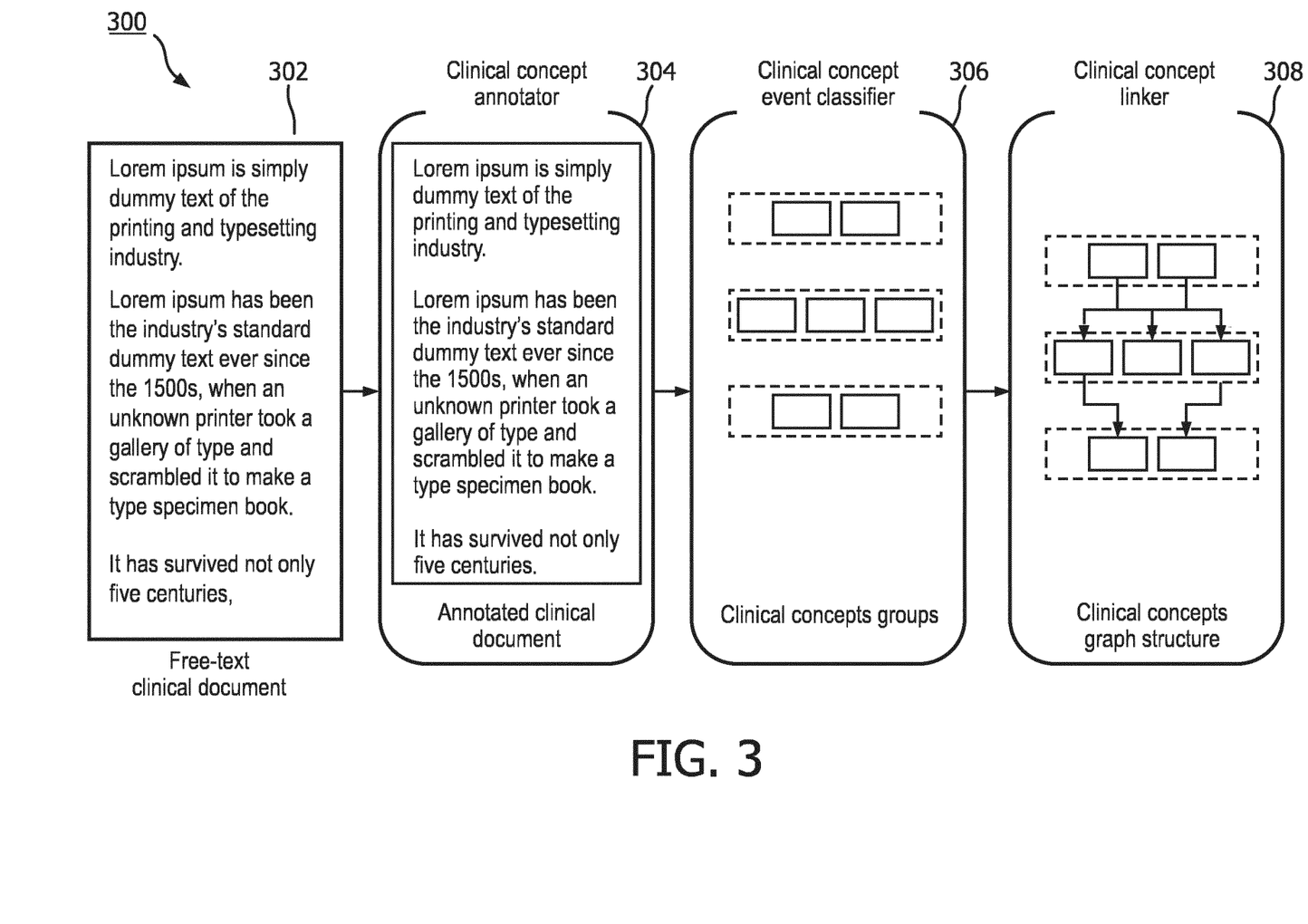
FIG. 3 illustrates a pipeline of components, in accordance with one or more embodiments.

FIG. 3 illustrates a pipeline 300 of components, in accordance with one or more embodiments. As shown in FIG. 3, pipeline 300 may include one or more of a free-text clinical document 302, a clinical concept annotator 304, a clinical concept event classifier 306, a clinical concept linker 308, and/or other components. Arrows in FIG. 3 show an exemplary flow of data through the pipeline 300.

In some embodiments, clinical concept annotator 304 uses one or more of natural language processing (NLP), regular expression (Regex), medical ontologies (e.g., SNOMED and/or RadLex), and/or other techniques to parse, identify, and/or annotate clinical concepts within free-text clinical documents. For example, in the sentence "A primary neoplasm is suspect rather than a metastatic lesion" of a radiology reports, the term "neoplasm" may be mapped into the SOMED-CT clinical findings with code identifier 399981008.

An identified clinical term is stored in a data structure referred to as a concept node, in some embodiments. This data structure has a set of properties to further categorize the stored concept. For example, the concept node may store the frequency of this concept in one or more of a sentence, paragraph, and/or entire document. The concept node may also store the qualifier or negation status of a clinical term, or have a link to other clinical knowledge in which the clinical concept was mapped (e.g., RadLex or ICD-10). These properties enable the computation of similarity between the clinical node or/and clinical documents.

Figure 4:
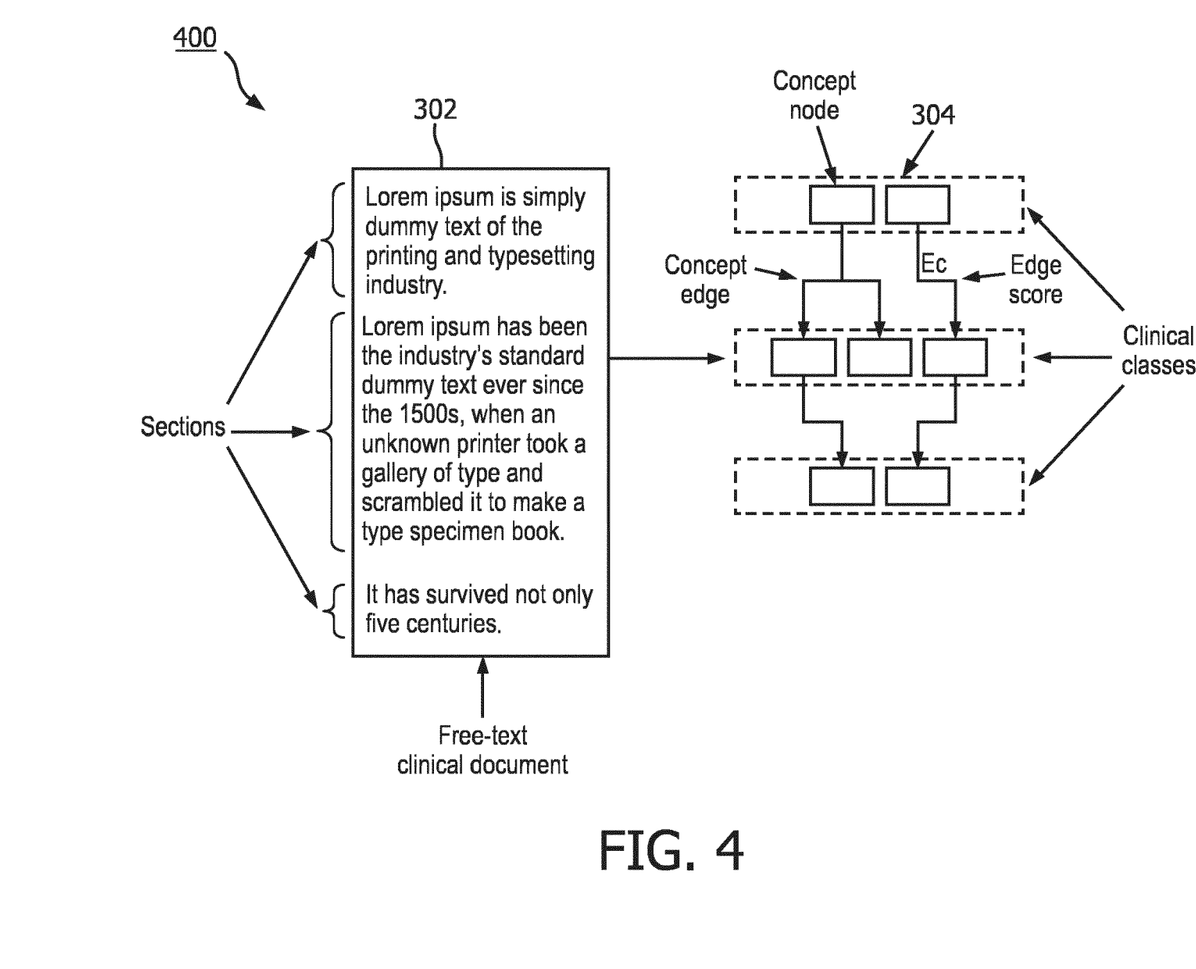
FIG. 4 illustrates a clinical concept annotator and a clinical concept linker is depicted, in accordance with one or more embodiments.

Referring to FIG. 4, schematic 400 depicts clinical concept annotator 304 and clinical concept linker 308. The rectangles (which may be color-coded) in the right of the figure represent clinical concepts that were mapped in free-text clinical document 302 represented in the left of the figure. Words (which may be color-coded) in free-text clinical document 302 represent the identified clinical terms.

Figure 5:
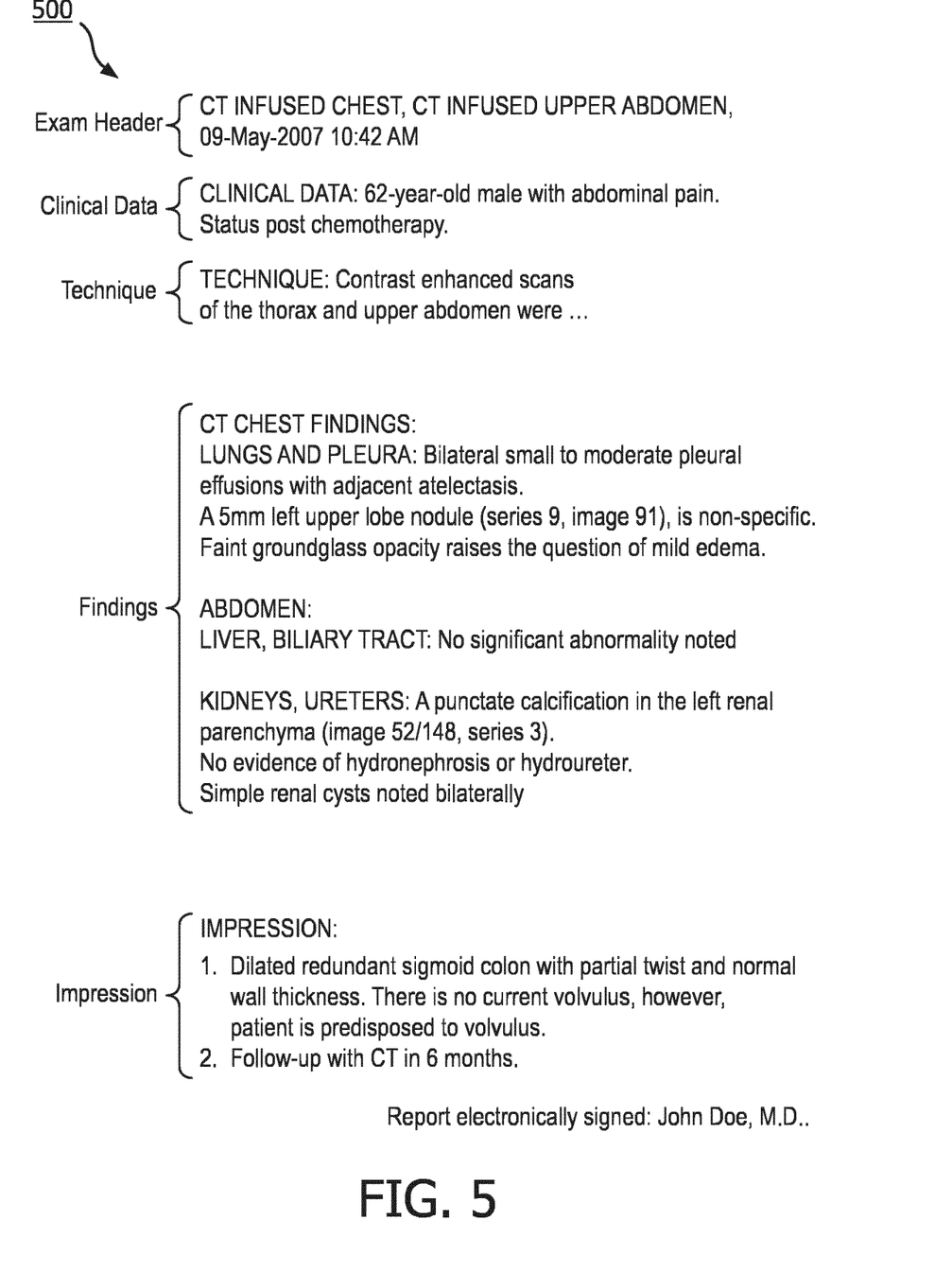
FIG. 5 illustrates an example of sections of a radiology report, in accordance with one or more embodiments.

FIG. 5 illustrates an example of sections of a radiology report 500, in accordance with one or more embodiments.

Clinical concept event classification will be discussed. Free-text clinical document 302 may include clinical terms that were associated with numerous clinical concept categories, including one or more of clinical findings, symptoms, diagnoses, procedures, and/or anatomical structures. These free-text reports (free-text clinical documents 302) are thus a source of significant information for medical personnel evaluating a subject. The clinical documents are often organized in sections covering different aspects in the subject care.

Some embodiments according to the present technology classify clinical concepts of free-text clinical documents 302 into clinical event classes. These clinical event classes are intended to organize concepts into hierarchic categories based on a clinical model such as one or both of openEHR and/or SOAP.

It is noteworthy that the openEHR event (action, observation, evaluation, and instruction) may be used as a model to classify clinical concepts into clinical event classes. Free-text clinical documents 302 are often organized into sections that described a specific aspect of the document (e.g., clinical, technical, or administrative). Although the sections are not standardized across all institutions, the reports typically contain the sections Exam Header containing DICON information, Clinical Data to represent subject's presenting conditions and clinical history, Technique to include the scanning protocol used, and a Findings section to report the status of various findings that have been identified in an image study. The last section in a radiology report, the Impression section, summarizes the diagnosis related information as well as interpretation of current findings. FIG. 5 depicts an example of sections in a radiology report.

Clinical concepts in the Exam Header section may be mapped for the openEHR event "action" since they represent the action that generated the imaging exam. The clinical concepts in the Clinical Data, Technique, and Finding sections may be understood as observations that physicians and/or other healthcare professionals such as radiology technologists or others made using the subject history or the imaging exam. Therefore, clinical concepts in these sections could be mapped to the openEHR "observation" event. The concepts in the Impression section summarize the diagnosis and assign next steps in the treatment plan such as follow-up recommendation. The clinical concepts associated with the diagnosis may be mapped to the openEHR "evaluation" event, and the clinical concepts associated with a follow-up recommendation may map to the openEHR "instruction" event.

The clinical concept event classification identifies sections in free-text clinical documents 302 and then classifies clinical concepts (clinical nodes) within these sections into one of the clinical concepts events. The identification of the section can be performed using natural language processing (NLP) and Regular Expression (Regex). The identified clinical concepts of a section may be manually or automatically assigned for an openEHR event (observations, evaluations, instructions, and actions).

Figure 6:
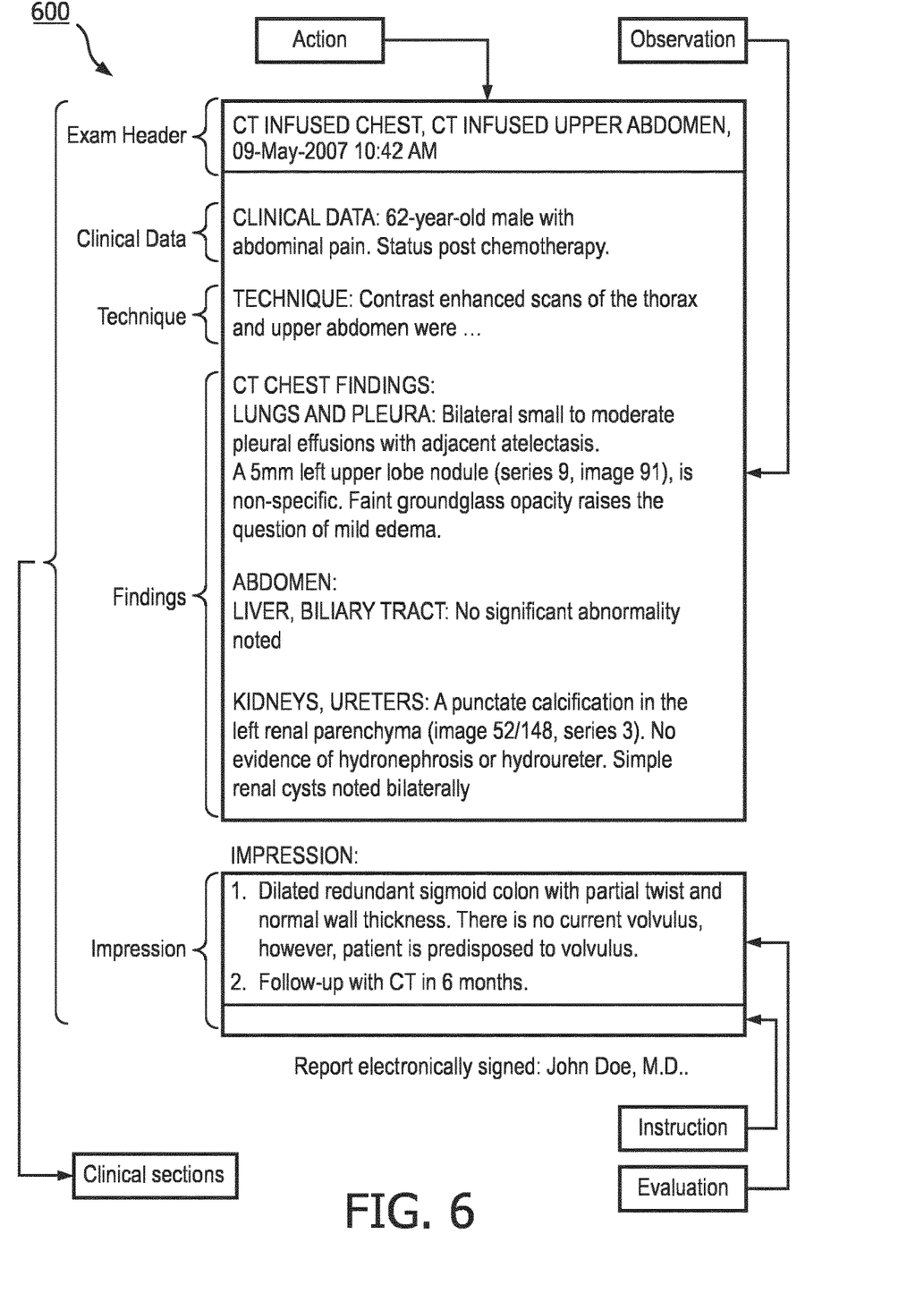
FIG. 6 illustrates an example of classification of clinical concepts in a document to clinical event class, in accordance with one or more embodiments.

FIG. 6 illustrates an example 600 of classification of clinical concepts in a document to clinical event class, in accordance with one or more embodiments. In other words, the figure is an illustration of the clinical concepts event classification of clinical concepts in a radiology report.

In this novel approach various clinical concepts may be represented more than one time in a document similarity analysis, depending of the context of the concept in the document. This allows a context-sensitive analysis of clinical concepts in free-text clinical documents 302. For example, the presence of the clinical term "chemotherapy" in the Clinical Data section has a different meaning as the same term in the Impression section. The latter may represent an instruction for a suggested treatment while the first may represent a past treatment. This technology provides an extra dimension for analysing free-text documents 302.

Figure 7:
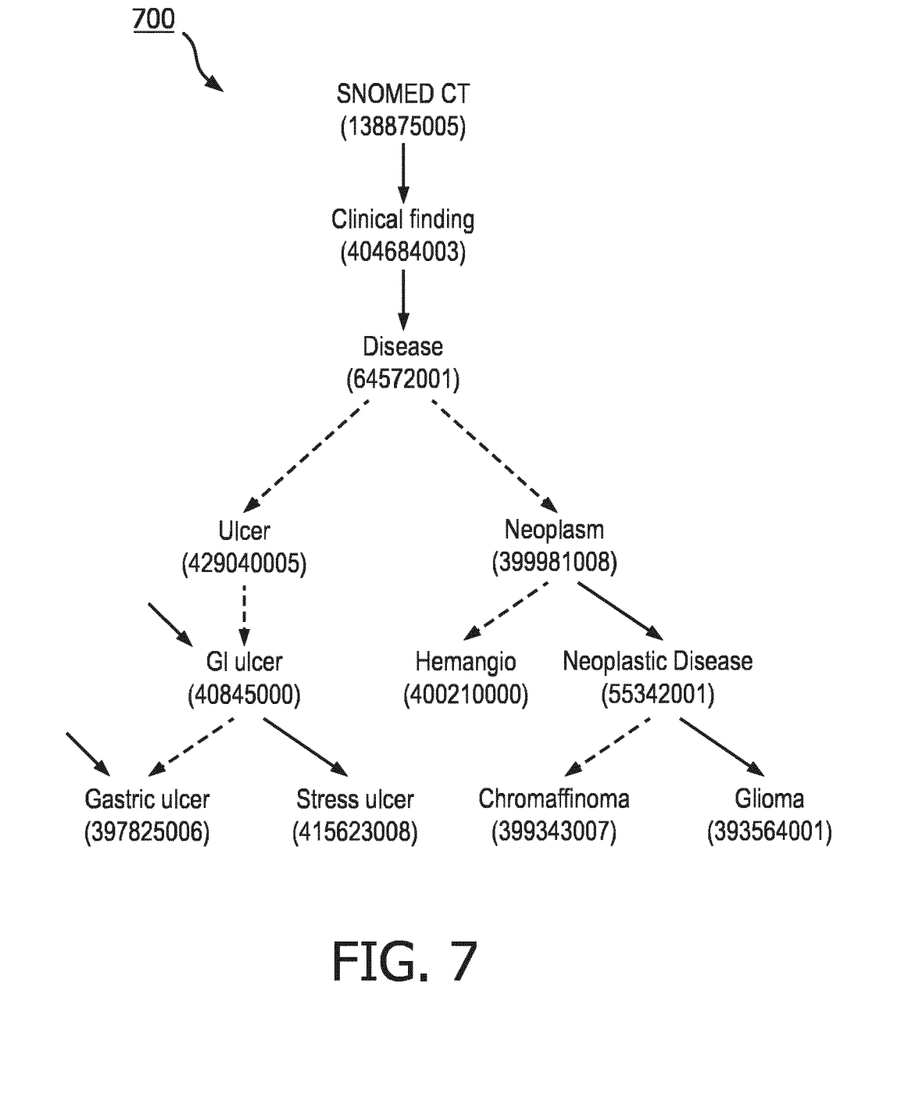
FIG. 7 illustrates links relating to a clinical concepts linking engine for creating links between clinical concepts, in accordance with one or more embodiments.

FIG. 7 illustrates links 700 relating to a clinical concepts linking engine for creating links between clinical concepts, in accordance with one or more embodiments. The clinical concept-linking engine creates links between clinical concepts (concept nodes) previously classified into different openEHR events. These links are referred to as Concept Edge. Each of a plurality of the edges has properties that further characterize the relation between two clinical nodes that they have connected. The properties are intended to represent the semantic relationship between clinical concepts, but also can be used to store information such as one or more of the weight, frequency, or any clinical and/or statistic heuristic. The edge properties may be used to create an Edge Score ($E_C$) to indicate the similarity between two clinical concepts.

The concept edge may be computed using any semantic relationship between clinical concepts. For example, take into consideration the SNOMED-CT "is-a" relationship used to represent a hierarchical relationship between concepts. In this relationship, we have the following association:

"Gastric Ulcer" is-a "GI Ulcer",
"GI Ulcer" is-an "Ulcer",
"Ulcer" is a "Disease",
"Hemangioma" is-a "Neoplasm", and
"Neoplasm" is-a "Disease".

FIG. 7 depicts a partial SNOMED CT ontology where this relationship was obtained (Figure extracted from Mabotuwana et. all 2013—An ontology-based similarity measure for biomedical data—Application to radiology reports"). Values within parentheses represent SNOMED CT concept identifiers.

Now, consider two clinical nodes that represent the clinical concepts "Hemangioma" and "Gastric Ulcer," respectively. The clinical edge between these two clinical nodes may be determined by the shortest path between "Hemangioma" and "Gastric Ulcer" in the SNOMED is an ontological representation. The dashed lines in FIG. 7 show the shortest path between "Hemangioma" and "Gastric Ulcer."

Figure 8:
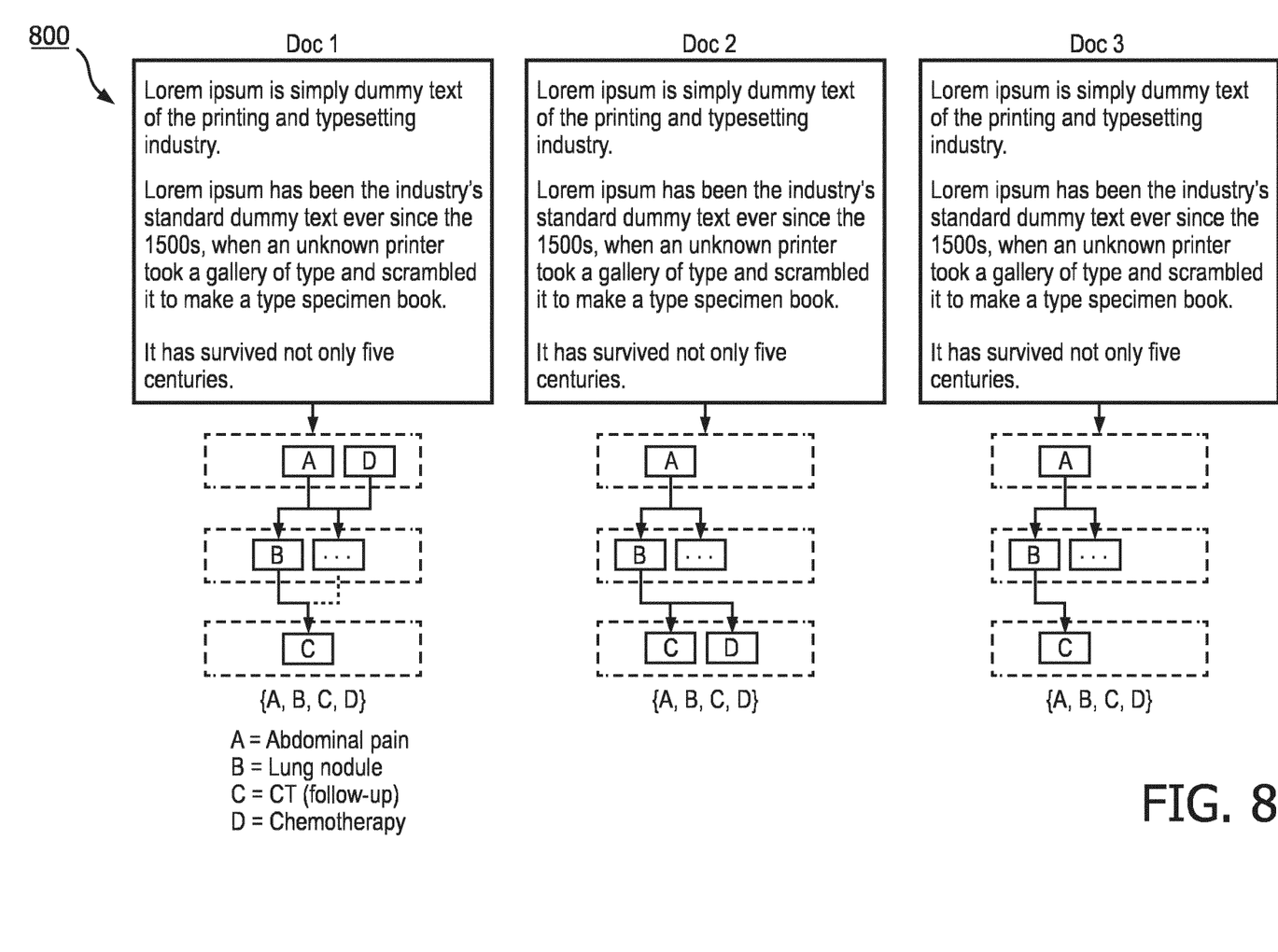
FIG. 8 illustrates an example of utilization of a clinical concepts linking engine to create link between clinical concepts, in accordance with one or more embodiments.

FIG. 8 illustrates an example 800 of utilization of a clinical concepts linking engine to create link between clinical concepts (Concept Edge), in accordance with one or more embodiments. An example will be given of a potential of the use of this invention to aid healthcare professionals in the delivery care process. This new approach allows a context sensitive analysis of clinical concepts in free-text clinical documents. Consider the case where a radiologist has a clinical document (Doc 1) and he wants to find documents that are similar to Doc 1 to learn more about a specific clinical condition (in this example, a similar document should describe a similar clinical condition). Suppose that his dataset contains only three clinical documents (Doc 1, Doc 2 and Doc 3). FIG. 8 shows these three clinical documents and the graph structure computed using the proposed invention.

The clinical concepts presented in these three clinical documents are: A=Abdominal Pain, B=Lung Nodule, C=Computer Tomography (CT) (follow-up), and D=Chemotherapy. Using the proposed methodology, the clinical concepts were classified in three different clinical event classes that are represented by the rectangles (which may be color coded) in FIG. 8. For example, a green rectangle may represent the Subject History class, an orange represent the Findings class, and a blue represent the Impression class.

In clinical document Doc 1, a lung nodule is identified in a subject under chemotherapy who complains about abdominal pain. The radiologist recommendation in the Doc 1 is follow-up with a CT scan. In clinical document Doc 2, a lung nodule is identified in a subject who complains about abdominal pain. Due the size and characteristic of the nodule, the radiologist recommend chemotherapy and follow-up is with a CT scan. Note that there is no previous information of cancer treatment (chemotherapy) in the subject history but a new recommendation for a treatment.

Even though Doc 1 and Doc 2 have the same concepts A, B, C, and D, there is a huge difference between a subject who is under chemotherapy and another who has a recommendation to undergo chemotherapy (usually the radiologist suggests a treatment, but it is the referring physician who decides on the treatment). In the example described herein, the clinical document Doc 3 could be considered more similar than Doc 1 because both documents describe a subject who complains about abdominal pain. A lung nodule was identified and a CT scan is recommend as follow-up. Some embodiments presented herein are in the context of a clinical document(s) used to understand the semantic relationship between two documents.

It is noteworthy that due to the algorithmic nature of the present technology, the exact application of the same method is not easy to detect. However, the user interface and functionality of the system are very easy to detect in other systems. Any system that performs a similar function very likely has very similar algorithms as described in this invention. It is envisioned that the present technology is applicable to a broad range of healthcare domains, where free-text clinical documents are produced and stored (e.g., EMR and RIS).

Figure 9:
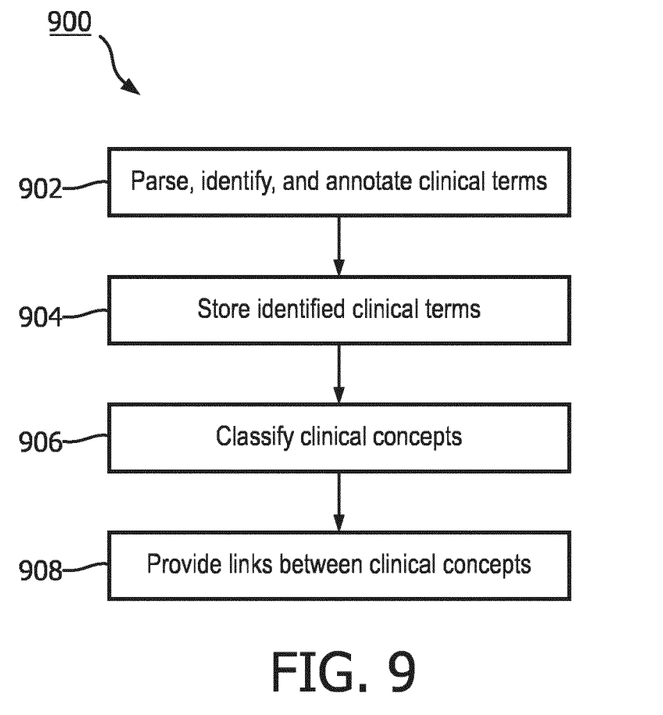
FIG. 9 illustrates a method for modeling free-text clinical documents into a hierarchical graph-like data structure based on semantic relationships among clinical concepts present in the documents, in accordance with one or more embodiments.

FIG. 9 is illustrates one method 900 for modeling free-text clinical documents into a hierarchical graph-like data structure based on semantic relationships among clinical concepts present in the documents, in accordance with one or more embodiments. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting.

In some embodiments, one or more operations of method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 902, natural language processing is used for parsing, identifying, and annotating clinical terms within free-text clinical documents. Operation 902 may be performed by one or more hardware processors 120 configured to execute a machine-readable instruction component that is the same as or similar to one or more of components 108, 110, 112, and/or 114 (as described in connection with FIG. 1), in accordance with one or more implementations.

At an operation 904, identified clinical terms are stored in a concept node, the concept node being a data structure that has a set of properties to categorize stored concepts. Operation 904 may be performed by one or more hardware processors 120 configured to execute a machine-readable instruction component that is the same as or similar to one or more of components 108, 110, 112, and/or 114 (as described in connection with FIG. 1), in accordance with one or more implementations.

At an operation 906, clinical concepts of free-text clinical documents are classified into clinical event classes. The free-text clinical documents include clinical terms that were associated with clinical concept categories. Classifying clinical concepts includes organizing free-text clinical documents into sections that describe a specific aspect of the free-text clinical documents that include one or more of clinical, technical, or administrative aspects of the documents. Operation 906 may be performed by one or more hardware processors 120 configured to execute a machine-readable instruction component that is the same as or similar to one or more of components 108, 110, 112, and/or 114 (as described in connection with FIG. 1), in accordance with one or more implementations.

At an operation 908, links are provided between clinical concepts such that individual clinical concepts correspond to individual concept nodes, the links being concept edges. The concept edges have properties that further characterize relationships between corresponding pairs of clinical nodes. Characterizing the relationships includes (1) computing the concept edges using a semantic relationship between clinical concepts and (2) providing an edge score to indicate a similarity between two clinical concepts. Operation 908 may be performed by one or more hardware processors 120 configured to execute a machine-readable instruction component that is the same as or similar to one or more of components 108, 110, 112, and/or 114 (as described in connection with FIG. 1), in accordance with one or more implementations.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured for modeling free-text clinical documents into a hierarchical graph-like data structure based on semantic relationships among clinical concepts present in the documents, the system comprising:
   one or more hardware processors configured by machine-readable instructions to:
   use natural language processing for parsing, identifying, and annotating clinical terms within free-text clinical documents, wherein the clinical terms are associated with clinical concept categories;
   store the identified clinical terms in concept nodes, wherein the concept nodes each comprise a data structure that has a set of properties to categorize stored concepts;
   classify clinical concepts of the free-text clinical documents into clinical event classes, wherein classifying the clinical concepts includes organizing the free-text clinical documents into sections that describe a specific aspect of the free-text clinical documents that include one or more of clinical, technical, or administrative aspects of the free-text clinical documents;
   provide links between the clinical concepts, wherein individual clinical concepts correspond to individual concept nodes, wherein the links are concept edges, wherein the concept edges have properties that further characterize relationships between corresponding pairs of the clinical nodes, wherein characterizing the relationships includes (1) computing the concept edges using a semantic relationship between the clinical concepts corresponding to the pairs of the concept nodes by determining a shortest path between the clinical concepts in an ontological representation, and (2) providing an edge score to indicate a similarity between the clinical concepts corresponding to one of the pairs of the concept nodes;
   generate graph-like data structures modeling the free-text clinical documents, wherein the graph-like data structures comprise the concept nodes linked by the concept edges; and
   measure at least one of inter-document and inter-subject similarity using the graph-like data structures.

2. The system of claim 1, wherein the one or more hardware processors are further configured by machine-readable instructions to use one or both of regular expression and medical ontologies for parsing, identifying, and annotating the clinical concepts within the free-text clinical documents.

3. The system of claim 1, wherein the clinical concept categories include one or more of clinical findings, symptoms, diagnoses, procedures, or anatomical structures.

4. The system of claim 1, wherein the one or more hardware processors are further configured by machine-readable instructions to cause the clinical event classes to organize the clinical concepts into hierarchic categories based on a clinical model including one or both of openEHR and SOAP.

5. The system of claim 1, wherein the one or more hardware processors are further configured by machine-readable instructions to effectuate a context sensitive analysis of the clinical concepts in the free-text clinical documents.

6. A method for modeling free-text clinical documents into a hierarchical graph-like data structure based on semantic relationships among clinical concepts present in the documents, the method comprising:
   using natural language processing for parsing, identifying, and annotating clinical terms within free-text clinical documents, wherein the clinical terms are associated with clinical concept categories;
   storing the identified clinical terms in concept nodes, wherein the concept nodes each comprise a data structure that has a set of properties to categorize stored concepts;
   classifying clinical concepts of the free-text clinical documents into clinical event classes, wherein classifying the clinical concepts includes organizing the free-text clinical documents into sections that describe a specific aspect of the free-text clinical documents that include one or more of clinical, technical, or administrative aspects of the free-text clinical documents;
   providing links between the clinical concepts, wherein individual clinical concepts correspond to individual concept nodes, whereon the links are concept edges, wherein the concept edges having properties that further characterize relationships between corresponding pairs of the clinical nodes, wherein characterizing the relationships includes (1) computing the concept edges using a semantic relationship between the clinical concepts corresponding to the pairs of the concept nodes by determining a shortest path between the clinical concepts in an ontological representation, and (2) providing an edge score to indicate a similarity between the clinical concepts corresponding to one of the pairs of the concept nodes;
   generating graph-like data structures modeling the free-text clinical documents wherein the graph-like data structures comprise the concept nodes linked by the concept edges; and
   measuring at least one of inter-document and inter-subject similarity using the graph-like data structures.

7. The method of claim 6, further comprising using one or both of regular expression and medical ontologies for parsing, identifying, and annotating the clinical concepts within the free-text clinical documents.

8. The method of claim 6, wherein the clinical concept categories include one or more of clinical findings, symptoms, diagnoses, procedures, or anatomical structures.

9. The method of claim 6, further comprising causing the clinical event classes to organize the clinical concepts into hierarchic categories based on a clinical model including one or both of openEHR and SOAP.

10. The method of claim 6, further comprising effectuating a context sensitive analysis of the clinical concepts in the free-text clinical documents.

11. A system for modeling free-text clinical documents into a hierarchical graph-like data structure based on semantic relationships among clinical concepts present in the documents, the system comprising:
   means for using natural language processing for parsing, identifying, and annotating the clinical terms within the free-text clinical documents, wherein the clinical terms are associated with clinical concept categories;
   means for storing the identified clinical terms in concept nodes, wherein the concept nodes each comprise a data structure that has a set of properties to categorize stored concepts;
   means for classifying clinical concepts of the free-text clinical documents into clinical event classes, wherein classifying the clinical concepts includes organizing the free-text clinical documents into sections that describe a specific aspect of the free-text clinical documents that include one or more of clinical, technical, or administrative aspects of the free-text clinical documents;

means for providing links between the clinical concepts, wherein individual clinical concepts correspond to individual concept nodes, wherein the links are concept edges, wherein the concept edges have properties that further characterize relationships between corresponding pairs of the clinical nodes, wherein characterizing the relationships includes (1) computing the concept edges using a semantic relationship between clinical concepts corresponding to the pairs of the concept nodes by determining a shortest path between the clinical concepts in an ontological representation, and (2) providing an edge score to indicate a similarity between two clinical concepts corresponding to one of the pairs of the concept nodes;

means for generating graph-like data structures modeling the free-text clinical documents, wherein the graph-like data structures comprise the concept nodes linked by the concept edges; and means for measuring at least one of inter-document and inter-subject similarity using the graph-like data structures.

12. The system of claim 11, further comprising means for using one or both of regular expression and medical ontologies for parsing, identifying, and annotating the clinical concepts within the free-text clinical documents.

13. The system of claim 11, wherein the clinical concept categories include one or more of clinical findings, symptoms, diagnoses, procedures, or anatomical structures.

14. The system of claim 11, further comprising means for causing the clinical event classes to organize the clinical concepts into hierarchic categories based on a clinical model including one or both of openEHR and SOAP.

15. The system of claim 11, further comprising means for effectuating a context sensitive analysis of the clinical concepts in the free-text clinical documents.

* * * * *